Feb. 11, 1969 W. J. KORTH 3,426,882
BOARD TURNING APPARATUS
Filed April 4, 1967 Sheet 1 of 2
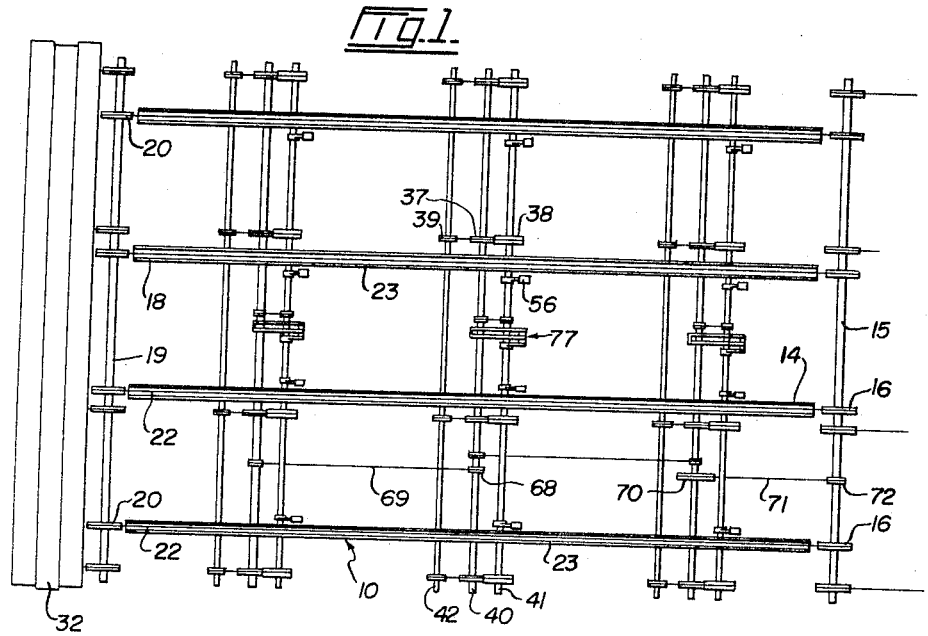
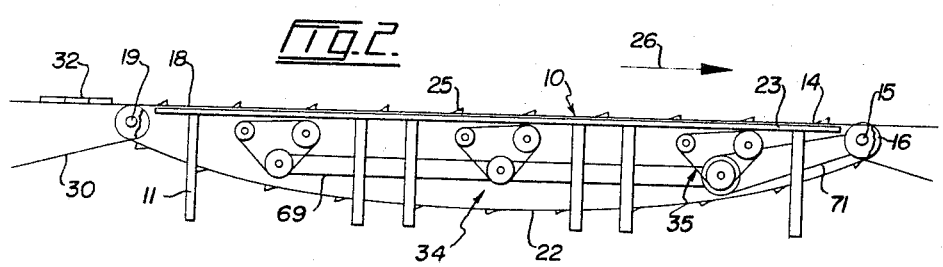
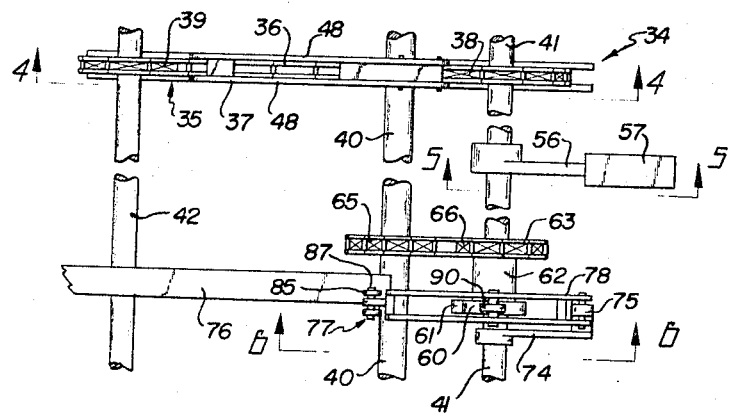
INVENTOR
WILLIAM J. KORTH
BY
*Fetherstonhaugh & Co.*
ATTORNEYS

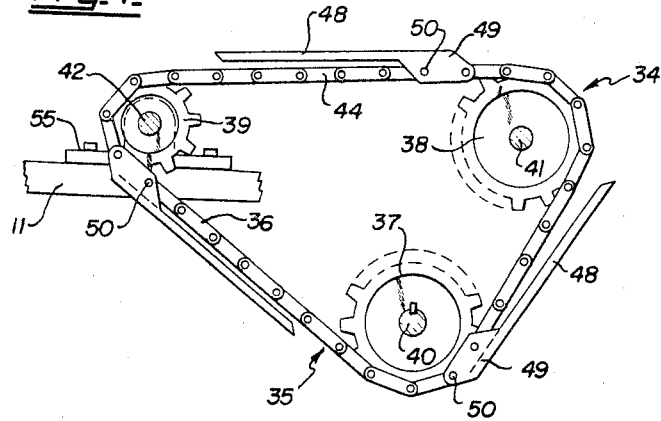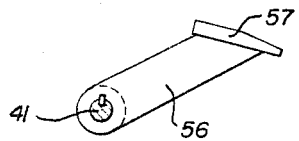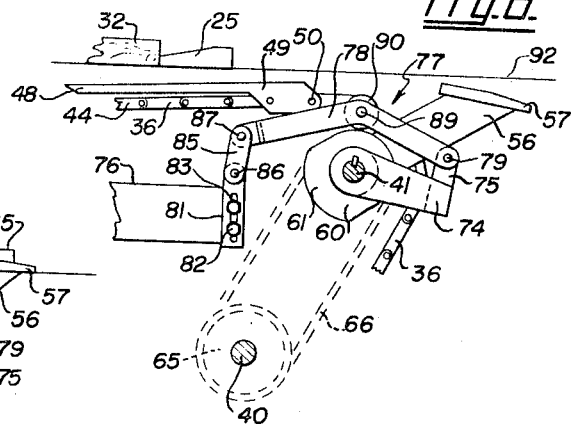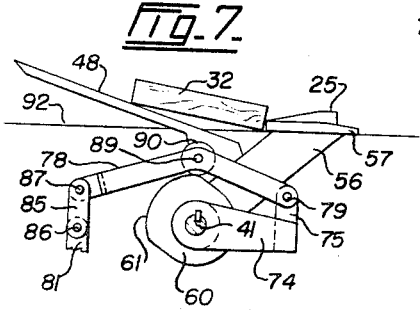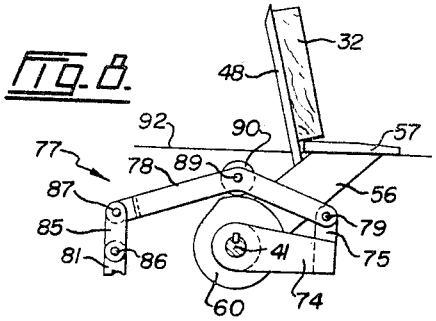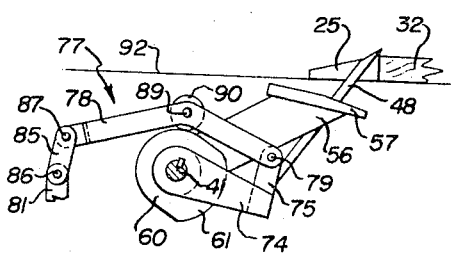

United States Patent Office 3,426,882
Patented Feb. 11, 1969

3,426,882
BOARD TURNING APPARATUS
William J. Korth, North Vancouver, British Columbia, Canada, assignor to Korth Machinery Limited, Vancouver, British Columbia, Canada
Filed Apr. 4, 1967, Ser. No. 628,364
U.S. Cl. 198—33
Int. Cl. B65g 47/24
18 Claims

ABSTRACT OF THE DISCLOSURE

An apparatus for turning boards being moved edgewise at regularly spaced intervals by a fast-moving conveyor. The apparatus operates automatically to invert the boards while maintaining the forward speed and regular spacing of the boards on the conveyor.

Background of the invention

This invention relates to apparatus generally intended for use by the lumber industry and which is particularly adapted for use in sawmills and planing mills to turn boards being inspected and graded for further processing as they move along on a conveyor.

In an effort to keep production high and labour costs at a minimum, sawmills have been forced to introduce a variety of machines for performing tasks which were formerly done by hand. For example, many mills now employ automatically operated processing equipment such as resaws, grade markers, end printers, sorters and the like. Such equipment processes the lumber to a stage where it is almost ready for shipment and sale. Normally, the lumber is delivered to the aforementioned processing equipment by a conveyor. An operator known as a grader is stationed alongside the conveyor and it is his job to inspect and grade each piece of lumber. The grader marks each lumber piece so that the man operating the processing equipment can signal the equipment to carry out whatever further processing is required. In some instances, where production is not high, the grader will signal the equipment to deal with each board as required. However, regardless of who does the signalling, the grader must view all sides of each piece of lumber as it passes his station, which makes it necessary for the board to be turned over at least once. The conveyor runs at a fairly high speed and in order for the grader or the equipment operator to signal correctly and for the equipment to function properly, it is important that the boards on the conveyor maintain a predetermined spacing and that they be delivered to the equipment with the same spacing between the boards.

Hitherto board turning has been done either manually or by conventional board turning equipment. Both methods have been found to be unsatisfactory for use in conjunction with the latest processing equipment and the high conveyor speeds involved.

Summary of the invention

The present invention overcomes the disadvantages of known board turners by providing apparatus having a coacting turning arm and stop, both of which are operated in timed relation to the speed of the conveyor delivering the lumber for further processing. The arm and stop cooperate to turn a board through 180° and to move the board a predetermined space on the conveyor. The boards can vary as to width and length and the apparatus will still function in the desired manner. If necessary, the apparatus can be adjusted to accommodate a run of boards of a particular thickness. The apparatus can provide one turning station for a single grader or, if desired, two or more turning stations for a corresponding number of graders who would work together as a team to inspect and grade lumber travelling at high speed and in large volumes.

Brief description of the drawings

FIGURE 1 is a schematic plan of the board turning apparatus and the conveying apparatus, in accordance with the present invention, FIGURE 2 is a similar side elevation of the apparatus of FIGURE 1, FIGURE 3 is an enlarged fragmentary plan of some of the parts of a single turning unit, and FIGURE 4 is a section taken on the line 4—4 of FIGURE 3, FIGURE 5 is a section taken on the line 5—5 of FIGURE 3, FIGURE 6 is a section taken on the line 6—6 of FIGURE 3, and FIGURES 7, 8 and 9 are side elevations of portions of the turning apparatus showing the various positions they assume when turning a board.

Description of the preferred embodiments

Referring particularly to FIGURES 1 and 2 of the drawings, the numeral 10 indicates generally a conveyor which is mounted on a frame 11. The right or outfeed end 14 of the conveyor 10 is provided with a transversely extending head shaft 15. Mounted on the shaft 15 are a number of suitably spaced sprockets 16. Journalled on the frame 11, at the left or infeed end 18 of the conveyor, is a transverse tail shaft 19. Shaft 19 is fitted with a number of sprockets 20 which are freely rotatable thereon. Trained over the longitudinally aligned sprockets 16 and 20 are transversely spaced chains 22. Four chains 22 are illustrated in FIGURE 1 of the drawings but it will be understood the conveyor 10 can be any suitable width with a corresponding number of chains. The upper run of each chain 22 is slidably supported in a guide channel 23 mounted on the frame 11. Each conveyor chain 22 preferably is fitted with a plurality of upstanding lugs 25, said lugs being equidistantly spaced along the entire length of the endless chain. The lugs 25 of the several chains are aligned across the width of the conveyor 10. The head shaft 15 is driven by suitable means, not shown, to rotate the chains 22 at a constant speed in the direction of arrow 26 of FIGURE 2. If desired, the conveyor 10 can be provided with lugless chains, not shown.

The conveyor 10 receives the boards which are to be turned over, from a suitable feed mechanism 30. A supply of boards 32 is maintained on the delivery end of the mechanism 30 and said mechanism is synchronized with the operation of the conveyor 10 to place one board 32 at a time on the chains 22 immediately behind each set of transversely aligned lugs 25. Thus, each board 32 is moved edgewise by the conveyor chains 22 with the leading edge of said board in contact with trailing edges of the lugs 25. When lugless conveyor chains are used, the mechanism is capable of placing the boards on the chains at the same regularly spaced intervals.

One or more identical turning units 34 are provided along conveyor 10, there being three of these units illustrated in FIGURES 1 and 2. Each unit 34 comprises an endless transmitting element 35 having a run extending substantially parallel with and spaced below the conveyor. Each unit 34 has a plurality of these transmitting elements spaced transversely on conveyor 10. For example, an element 35 is provided alongside each chain 22. Since these transmitting elements are identical only one will be described in detail.

In this example, each transmitting element 35 includes an endless chain 36 extending around sprockets 37, 38 and 39 respectively mounted on shafts 40, 41 and 42 which extend transversely of and beneath the conveyor 10. The upper run 44 of chain 36 is disposed at a slight angle to the conveyor, and after the chain travels around sprocket 38 which has a relatively short radius, it moves downwardly away from the conveyor at a steep angle. Thus, the chain 36 is supported by the sprockets in substantially triangular form as viewed in side elevation.

Referring now particularly to FIGURE 4, it will be seen that the chain 36 is fitted with a number of turning arms 48, three such arms being illustrated in the drawing. Each arm 48 has an enlarged end 49 which is U-shaped so as to straddle the chain 36. The enlarged ends 49 of the arms are secured to the chain 36 preferably by means of the pins 50 which connect adjoining links of said chain. Normally the turning arms 48 are disposed substantially parallel to the chain 36 with their free ends extending away from the direction of rotation of said chain, which direction is clockwise as viewed in FIGURE 4.

The turning arms 48 are thus secured to the chain so that, as the forward or enlarged ends 49 of the arms move around the sprocket 38, the free ends of said arms swing upwardly above the conveyor chains 22, see FIGURES 7 and 8. When the ends 49 move off the sprocket 38, the turning arms 48 move back into parallelism with the adjoining chain run and said arms are drawn away from the conveyor at an obtuse angle, see FIGURE 9. It will be noted that an endless cable or an endless belt, neither of which is illustrated in the drawings, could be used in place of the chain 36 of the transmitting elements.

The shaft 42 is a take-up shaft and for this reason is journalled in frame supported bearings 55 which can be adjusted slightly longitudinally of the frame 11, see FIGURE 4 only. Shaft 41 is supported so that it can make a partial turn and will henceforth be referred to as a turnshaft. Shaft 41 is fitted with a number of fingers 56, there preferably being one such finger alongside each guide channel 23 of the conveyor. The fingers 56 are secured to the shaft 41 against rotation and project upwardly towards the end 14 of the conveyor. A stop 57 is secured to the upper end of each finger 56.

Rotatably mounted on each turnshaft 41, near the centre of the conveyor 10, is a cam 60 having a lobe 61. As best shown in FIGURE 3, the cam 60 is mounted on a hub 62 and fitted to this hub is a sprocket 63. A sprocket 65 is keyed to the shaft 40 and an endless chain 66 connects this sprocket to the sprocket 63 on the hub 62, which hub rotates freely on the shaft 41.

Small sprockets 68 are fitted to the shafts 40, see FIGURE 1. An endless chain 69 connects the sprockets 68 of the several units 34 together. The shaft 40, near the outfeed end 14 of the conveyor, is also fitted with a sprocket 70. Sprocket 70 is connected by a chain 71 to a sprocket 72 mounted on the head shaft 15. The speed at which the units 34 are driven is determined by the relative sizes of the sprockets 70 and 72.

Near the cam 60 of each unit 34, the turnshaft 41 is fitted with a lever 74 which extends towards the end 14 of the conveyor. An upright lug 75 is secured to the free end of the lever 74. The lug 75 is connected to a conveyor frame part 76 by means of a linkage which is generally indicated by the numeral 77. Linkage 77 includes a bar 78 which is pivotally connected to the lug 75 by a pin 79. An anchor plate 81 is secured to the frame part 76 by means of bolts 82. The bolts 82 extend through a slot 83 in the plate 81 so that said plate can be adjusted vertically. A link 85 is secured to the plate 81 by a pivot pin 86. Another pivot pin 87 secures the upper end of the link 85 to an adjoining end of the bar 78. The bar 78 bends upwardly about mid-length and fitted to this bend in the bar is a spindle 89 which journals a cam roll 90. The inventor also envisages the use of a small air cylinder, not shown, which is mounted on the frame part 76 with the piston rod thereof operatively connected to the link 85. Such a fluid operated device would enable the position of the bar 78 to be adjusted by actuation of a remote control and if necessary with the apparatus in operation.

In FIGURES 6 to 9 of the drawings, the line 92 represents the tops of the conveyor chains 22. The lugs 25 project a short distance above the horizontal plane indicated by line 92.

The height that the stops 57 of each unit 35 are required to project above the line 92 is determined by the thickness of the boards which are to be turned. To adjust the projection of the stops 57 according to board thickness, the bolts 82 are slackened and the anchor plate 81 is raised or lowered as required before retightening said bolts. This moves the cam roll 90 relative to the surface of the cam 60 and varies the arcs through which the several stops of the turning unit 34 will swing.

It will be noted the spacing of the arms 48 on the chains 36 is the same as the spacing between one set of transversely aligned lugs 25 and the next adjacent set of lugs. The shafts 40 are rotated in suitably timed relation to the speed of rotation of the head shaft 15. Assuming that the conveyor 10 has three turning units 34, the speed of rotation of shaft 15 is three times the speed of rotation of shafts 40. Thus, each unit 34 would operate to turn every third board and every board travelling from one end of the conveyor to the other would be turned once. Three lumber graders are required to operate the three units 34.

FIGURES 6 to 9 show the sequence of operations of one of the turning units 34. FIGURE 6 shows a board 32 approaching the shaft 40 with the leading edge of said board hard against the trailing edges of the lugs 25. At this time, the uppermost turning arms 48 are parallel to adjacent runs 44 of the chains 36 and the stops 57 are disposed below the line 92. The cam roll 90 is riding on the cam 60 with the lobe 61 of said cam about to contact said roll.

When board 32 is approximately centered over the turn shaft 41, see FIGURE 7, the enlarged ends 49 of the top turning arms start to move around the peripheries of the sprockets 38. This causes the arms 48 to swing upwardly through an arc and engage the trailing edge of the board. At the same time, the lobe 61 of the cam engages the cam roll 90 and swings the bar 78 upwardly. Movement of the bar 78 in an upward direction causes the lever 74 to swing in the same direction whereupon the turnshaft 41 is rotated a few degrees in a counter clockwise direction. Turning movement of the shaft 41 in this direction swings the fingers 56 upwardly so that the stops 57 are projected above the line 92. This movement disposes the stops 57 in the path of the leading edge of board 32, as shown in FIGURE 7. Continued movement of the arms 48 through their arcuate paths of travel cause the board to first stand on edge, see FIGURE 8, and then roll forwardly on to its other face, see FIGURE 9. As the board 32 is momentarily halted and is turned over in this manner, it falls forward. The trailing edge of the board is then engaged by the leading edges of the next following row of lugs 25 and, in this position, the board is advanced to the end 14 of the conveyor 10.

In FIGURE 9, it will be seen that the stops 57 are lowered below the line 92 when the lobe 61 of the cam 60 passes from beneath the cam roll 90. The arms 48 which have just turned the board, move over the sprockets 38 and travel towards the sprockets 37. As this occurs, the free ends of the arms 48 are lowered so as to disengage the board. Thus, the board is inverted by the apparatus with the turning movement being done automatically and at a high rate of speed.

It will be noticed the turning arms 48 approach the board at an acute angle and engage the board gradually to first tilt it and then flip it over on to its other side. Thus, the leading edge of the board is disengaged from the row of lugs with which it had contact and is turned through 180°. When the board falls forward on to conveyor the trailing edge of said board is engaged by the next following row of lugs. In other words, the board remains in the same space between the lugs but drops back one set of lugs. Since the arms 48 move out of engagement with the board sharply and cleanly, there is no likelihood of the board being advanced on the conveyor chains ahead of the lugs.

The stops 57 serve as a pivot point about which the boards can turn without being thrust forwardly on the conveyor by the action of the turning arms. Should a run of boards of a greater thickness than those illustrated in the drawings be fed to the conveyor 10, it might be necessary to increase the projection of the stops 57. This can be done by adjustment of the anchor plate 81 and would eliminate the possibility of the thicker boards hopping over the stops 57 when first being engaged and tilted by the turning arms.

Thus, the present apparatus will function effectively to turn boards travelling at high speed and in closely spaced relation. Several lumber graders can operate as a team with each grader inspecting and grading an equal number of boards. The sorting equipment associated with the apparatus would include a memory system which would record the information signalled by each grader and at the proper time would actuate the further processing equipment as instructed.

I claim:

1. Apparatus for turning over a board being moved edgewise by a conveyor, comprising an endless transmitting element having a run extending substantially parallel with and spaced below said conveyor, said transmitting element moving around a short-radiused, curved element away from the conveyor, at least one turning arm normally lying along the transmitting element, means connecting the forward end of the turning arm with respect to the direction of movement of the transmitting element to the latter, the opposite end of the turning arm being free, means for moving the transmitting element around said curved element whereby said free end of the turning arm swings upwardly and forwardly relative to the conveyor to engage a passing board as the forward end of said arm moves around said curved element, following which the arm is drawn downwardly longitudinally thereof away from the conveyor, and stop means for engaging the board simultaneously with the turning arm to turn the board over the conveyor.

2. Apparatus as claimed in claim 1, in which said transmitting element travels around two additional curved elements spaced from one another and the first-mentioned curved element, and said turning arm is one of a plurality of similar arms spaced from each other along said transmitting element.

3. Apparatus as claimed in claim 1, in which said stop means comprises a stop adjacent said transmitting element and movable vertically between a normal position below said conveyor and a position in the path of the conveyor, and means operable approximately when the forward end of the turning arm starts to move around said curved element to move the stop into the conveyor path and to move the stop below the conveyor when the turning arm is being moved downwardly away from the conveyor.

4. Apparatus as claimed in claim 1, in which said curved element is mounted for rotation on a shaft extending beneath and transversely of said conveyor, said stop means including a finger mounted at one end on the shaft and inclined upwardly towards the conveyor, a stop on the opposite end of the finger normally below the conveyor, and means operable to swing said finger upwardly to move the stop in the path of the conveyor approximately when the forward end of the turning arm starts to move around said curved element and to swing the finger downwardly to move the stop below the conveyor when the turning arm is being moved downwardly away from the conveyor.

5. Apparatus as claimed in claim 4, in which said means for swinging said finger comprises a cam mounted on said shaft, linkage engageable by the cam to cause the finger to swing up and down, and means for rotating the cam in accordance with the speed of movement of the transmitting element.

6. Apparatus as claimed in claim 5, in which said linkage comprises a substantially horizontal bar near said cam, means operatively connecting one end of the bar to the shaft, link means pivotally connecting the opposite end of the bar to a conveyor part, a lobe on the cam adapted to raise said bar during each revolution of the cam to cause the finger to swing upwardly each time said bar is raised by the cam lobe.

7. Apparatus as claimed in claim 6, in which said means pivotally connecting the bar to a conveyor part is adjustable to enable the bar to be shifted relative to the cam.

8. Apparatus as claimed in claim 2, in which said transmitting element is an endless chain, said curved elements being sprockets over which the endless chain is trained, said sprockets being mounted on shafts extending transversely of the conveyor.

9. Apparatus as claimed in claim 8, in which a transmitting element is provided adjacent each side of the conveyor, said transmitting elements being driven in unison to swing their turning arms simultaneously into engagement with a passing board.

10. Apparatus as claimed in claim 9, in which a stop is provided near each transmitting element, said stops being coupled together for simultaneous projection above the conveyor.

11. Apparatus as claimed in claim 10, in which said endless chain is supported by the aforesaid sprockets in substantially triangular form whereby the turning arm is moved towards the conveyor at an acute angle to slowly engage and progressively turn the board and is moved away from the conveyor at a greater angle to quickly disengage the turned board.

12. Apparatus as claimed in claim 11, in which one of said shafts is a turnshaft, the uppermost of said sprockets being rotatably mounted on the turn shaft, said stops each being connected to the turnshaft by an upwardly extending finger.

13. Apparatus for turning over a board being moved edgewise by a conveyor having a frame and a transverse row of upstanding lugs engaged by a side edge of the board, said apparatus comprising a vertically disposed sprocket rotatably mounted in the frame below the conveyor, a driven endless chain trained over the sprocket, a turning arm secured at one end to the endless chain and extending away from the direction of travel of said endless chain, said turning arm being adapted to swing through an arc into contact with a side edge of the board remote from the side edge engaged by the row of lugs, and stop means carried by the frame adapted to be projected momentarily above the conveyor to engage the side edge of the board engaging the row of lugs to coact with the turning arm to invert said board on the conveyor.

14. Apparatus as claimed in claim 13, in which the turning arm and the stop coact to momentarily halt the board and deposit it on the conveyor to the rear of the row of lugs.

15. Apparatus as claimed in claim 14, in which the leading edge of the board engages the row of lugs and the turning arm contacts the trailing edge of said board.

16. Apparatus for turning over a board being moved edgewise by a conveyor having a frame, comprising a turn shaft mounted in the frame to extend transversely thereof in close proximity to the conveyor, a sprocket rotatably mounted on the turn shaft, a lower transverse shaft journalled in the frame below the turn shaft, a sprocket mounted on the lower transverse shaft, a driven endless chain connecting the aforesaid sprockets, a turning arm secured at one end to the endless chain and extending away from the direction of travel of said chain, a stop carried by the turn shaft, a cam rotatably mounted on the turn shaft, drive means connecting the lower shaft to the cam, a cam roll engaging the cam, a bar supporting the cam roll and being operatively connected to the frame and the turn shaft, and means for rotating the lower shaft to swing the turning arm and the stop upwardly through arcs above the conveyor to engage opposite side edges of the board and invert said board.

17. Apparatus as claimed in claim 16, and including means for adjusting the distance the stop will project above the conveyor to engage a side edge of the board.

18. Apparatus as claimed in claim 16, in which the turning arm engages the trailing edge of the board.

References Cited

UNITED STATES PATENTS 2,546,318   3/1951   Rayburn ------------ 198—190

RICHARD E. AEGERTER, *Primary Examiner.*